(12) United States Patent
Bernal et al.

(10) Patent No.: US 10,452,951 B2
(45) Date of Patent: Oct. 22, 2019

(54) ACTIVE VISUAL ATTENTION MODELS FOR COMPUTER VISION TASKS

(71) Applicant: Goodrich Corporation, Charlotte, NC (US)

(72) Inventors: Edgar A. Bernal, Webster, NY (US); Kishore K. Reddy, Vernon, CT (US); Michael J. Giering, Bolton, CT (US)

(73) Assignee: Goodrich Corporation, Charlotte, NC (US)

( * ) Notice: Subject to any disclaimer, the term of this patent is extended or adjusted under 35 U.S.C. 154(b) by 329 days.

(21) Appl. No.: 15/380,497

(22) Filed: Dec. 15, 2016

(65) Prior Publication Data

US 2018/0060691 A1 Mar. 1, 2018

Related U.S. Application Data

(60) Provisional application No. 62/380,193, filed on Aug. 26, 2016.

(51) Int. Cl.
*G06K 9/62* (2006.01)
*G06K 9/03* (2006.01)
(Continued)

(52) U.S. Cl.
CPC ......... *G06K 9/6203* (2013.01); *G06K 9/0063* (2013.01); *G06K 9/03* (2013.01);
(Continued)

(58) Field of Classification Search
CPC ............... H04N 19/103; H04N 19/426; H04N 5/23296; G06K 9/6203; G06K 9/6256;
(Continued)

(56) References Cited

U.S. PATENT DOCUMENTS 6,798,914 B1   9/2004   Nanni et al.
6,934,415 B2   8/2005   Stentiford
(Continued)

FOREIGN PATENT DOCUMENTS

WO   WO-2011048597 A1   4/2011
WO   WO-2014194345 A1   12/2014

OTHER PUBLICATIONS

Rameau Francois et al: "Control of a PTZ camera in a hybrid vision system", 2014 International Cnference on Computer Vision Theory and Applications (VISAPP), Scitepress, vol. 3, Jan. 5, 2014 (Jan. 5, 2014), pp. 397-405, XP032792206, [retrieved on Oct. 8, 2015] p. 1.
(Continued)

*Primary Examiner* — Daniel G Mariam
(74) *Attorney, Agent, or Firm* — Locke Lord LLP; Scott D. Wofsy; Judy R. Naamat

(57) ABSTRACT

An imaging method includes obtaining an image with a first field of view and first effective resolution and the analyzing the image with a visual attention algorithm to one identify one or more areas of interest in the first field of view. A subsequent image is then obtained for each area of interest with a second field of view and a second effective resolution, the second field of view being smaller than the first field of view and the second effective resolution being greater than the first effective resolution.

22 Claims, 5 Drawing Sheets

(51) Int. Cl.
*H04N 5/232* (2006.01)
*H04N 19/103* (2014.01)
*H04N 19/426* (2014.01)
*G06N 5/02* (2006.01)
*G06K 9/00* (2006.01)
*G06K 9/32* (2006.01)

(52) U.S. Cl.
CPC ......... *G06K 9/3233* (2013.01); *G06K 9/6256* (2013.01); *G06K 9/6267* (2013.01); *G06N 5/02* (2013.01); *H04N 5/23296* (2013.01); *H04N 19/103* (2014.11); *H04N 19/426* (2014.11)

(58) Field of Classification Search
CPC .. G06K 9/6267; G06K 9/0063; G06K 9/3233; G06N 5/02
USPC .......................................... 382/216, 232, 298
See application file for complete search history.

(56) References Cited

U.S. PATENT DOCUMENTS

| | | | |
|---|---|---|---|
| 7,049,597 B2 * | 5/2006 | Bodkin | G01J 3/02 250/336.1 |
| 8,118,226 B2 * | 2/2012 | Olmstead | G06K 7/10722 235/455 |
| 8,223,837 B2 | 7/2012 | Sun et al. | |
| 8,369,652 B1 | 2/2013 | Khosla et al. | |
| 8,610,735 B2 | 12/2013 | Park et al. | |
| 8,885,887 B1 * | 11/2014 | Chen | G06T 7/246 345/611 |
| 9,014,467 B2 | 4/2015 | Hu et al. | |
| 9,129,158 B1 | 9/2015 | Medasani et al. | |
| 9,147,255 B1 | 9/2015 | Zhang et al. | |
| 9,204,169 B2 | 12/2015 | Han et al. | |
| 9,304,305 B1 * | 4/2016 | Paul | G02B 15/163 |
| 9,317,776 B1 | 4/2016 | Honda et al. | |
| 9,584,710 B2 * | 2/2017 | Marman | G08B 13/19652 |
| 9,769,387 B1 * | 9/2017 | Beard | G06K 9/0063 |
| 2009/0015674 A1 | 1/2009 | Alley et al. | |
| 2011/0026837 A1 | 2/2011 | Kita | |
| 2012/0328161 A1 | 12/2012 | Palenychka et al. | |
| 2014/0194345 A1 | 7/2014 | Peoples et al. | |
| 2016/0292589 A1 | 10/2016 | Taylor, Jr. et al. | |

OTHER PUBLICATIONS

European Search Report received from the European Patent Office (EPO) dated Jan. 29, 2018 for Application No. EP17188007.3.

* cited by examiner ized imagery

ACTIVE VISUAL ATTENTION MODELS FOR COMPUTER VISION TASKS

CROSS-REFERENCE TO RELATED APPLICATIONS

This application claims priority to and the benefits of U.S. Provisional Application No. 62/380,193, filed Aug. 26, 2016, the contents of which are incorporated herein in its entirety.

BACKGROUND OF THE INVENTION

1. Field of the Invention

The present disclosure generally relates to imaging, and more particularly to systems and methods for acquiring images based on the information contained within the imaged scene. The present disclosure also relates to systems and methods that extract information from the acquired images in order to make at least one decision regarding the nature of the scene to which the acquired images correspond. In some instances, the decision about the nature of the scene may be made by accumulating information extracted from each of the portions of the scene being imaged.

2. Description of Related Art

The majority of traditional approaches for automated reasoning from visual data, and particularly those based on Deep Learning frameworks, tend to be inefficient when processing large imagery potentially containing samples belonging to different classes. By way of illustration, consider image and/or video acquired with an unmanned aerial vehicle (UAV) equipped with an imaging device having a wide field of view. Due to its wide-angle nature, a single sample of said imagery may contain a variety of object types including background objects (e.g., vegetation, bodies of water, buildings, roads, etc.) as well as foreground objects, some of which may be of interest (e.g., people, buildings, weapons, etc.). Traditional computer vision algorithms adhere to the classical sliding window paradigm in which a large image is segmented into smaller blocks of different sizes, and the category for each block is assigned independently. Consequently, the computational complexity of said algorithm scales with the number of pixels (or, equivalently, with the number of blocks) in the incoming imagery. The motivation behind this modus operandi stems from the requirement of most computer vision algorithms to operate in highly supervised environments in which a given image is representative of a single class only, that is, where an object or objects present in a given image belong to a single category; clearly, this requirement is more easily satisfied by images spanning small fields of view since this limits the possible range of labels of objects present in the image.

In order to overcome these limitations, visual attention models which learn to process information only at locations of the incoming imagery that are relevant to the task at hand, have recently been successfully integrated with computer vision algorithms. The benefits of these approaches are improved computational efficiency as well as added robustness to multiple class labels per image. Such approaches can be limited insofar as they are passive, typically operating on fixed imagery and having no influence on the image acquisition process.

Such conventional imaging methods have generally been considered satisfactory for their intended purpose. There is still a need in the art for improved systems and methods of image acquisition and processing. The present disclosure provides a solution for this need.

SUMMARY OF THE INVENTION

An imaging system includes an imaging device, a controller operatively connected to the imaging device, and a non-transitory machine-readable memory disposed in communication with the controller. The memory has instructions recorded on it that, when read by the controller, controller to obtain an image with a first field of view and first effective resolution, analyze the image with a visual attention module to identify one or more areas of interest in the first field of view, and obtain one or more subsequent images for each area of interest. The one or more subsequent images have a field of view that is greater than the first field of view and has an effective resolution that is greater than the first effective resolution. The instructions also cause the controller to make a decision about the scene based on aggregated information extracted from the images.

In certain embodiments, the instructions can cause the controller to make the decision about the scene based on identification of a type of object in the scene and/or identification of a type of activity taking place in the scene. The instructions can cause the controller to analyze the image using raw image data. The instructions can cause the controller to analyze the image data in the compressed domain. Compression can be done prior to analyzing the image using a visual attention algorithm. It is contemplated that the visual attention algorithm can include a plurality of compression parameters, and that the instructions can cause the controller to select a compression parameter from the plurality of compression parameters according the type of decision that has to be made about the scene.

In accordance with certain embodiments, the instructions can cause the controller to one or more of pan, zoom, or tilt the imaging apparatus. The instructions can cause the controller to generate one or more of a pan, zoom, and tilt positioning instructions for the imaging device based on the analysis of at least one previously acquired image. The instructions can cause the cause the controller to issue the positioning instructions to the imaging systems prior to obtaining the subsequent image. The instructions can cause the controller to adjust a positional parameter of an aerial vehicle carrying the imaging system. The instructions can cause the controller to obtain the second image in real-time with analysis of the prior image.

It is also contemplated that, in accordance with certain embodiments, the instructions can cause the controller to cease imaging upon making a determination that sufficient information has been obtained from the processing of the acquired imagery. The imaging device can include a visible wavelength band sensor array for obtaining images based on visible light incident on the imaging device. The imaging device can include a sensor array to obtain image data from one or more regions of the electromagnetic spectrum. Examples include one or more of SWIR wavelength bands, NIR wavelength bands, MIR wavelength bands, or thermal wavelength bands.

An imaging method includes obtaining an image with a first field of view and first effective resolution and then analyzing the image with a visual attention algorithm to one identify one or more areas of interest in the first field of view. A subsequent image is then obtained for each area of interest with a second field of view and a second effective resolution, the second field of view being smaller than the first field of view and the second effective resolution being greater than the first effective resolution.

In certain embodiments, analyzing the image can include analyzing raw image data. Analyzing the image can include analyzing compressed domain image data. The method can also include compressing the image prior to analyzing the image with the visual attention algorithm. The subsequent image can be obtained in real-time or near-real-time.

In accordance with certain embodiments, obtaining the subsequent image can include one or more of panning, zooming, or tilting an imaging apparatus carried by an aerial vehicle. The method can include generating one or more of a pan, zoom, and tilt positioning instructions for an imaging system carried by an unmanned aerial vehicle based on the analysis of at least one previously acquired image. The instructions can be issued to the imaging system prior to obtaining the subsequent image.

It is contemplated that obtaining the image can include sensing electromagnetic radiation within a visible wavelength band. The sensed electromagnetic radiation can be from within an infrared band. The electromagnetic radiation can be from a short-wavelength infrared band, a near-infrared band, a mid-infrared band, and/or a thermal wavelength band. Other types of electromagnetic radiation can be considered, possibly comprising different portions of the electromagnetic spectrum. Once the visual attention module has determined that sufficient information is present in the image data, instructions can be issued to the imaging system to cease imaging.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
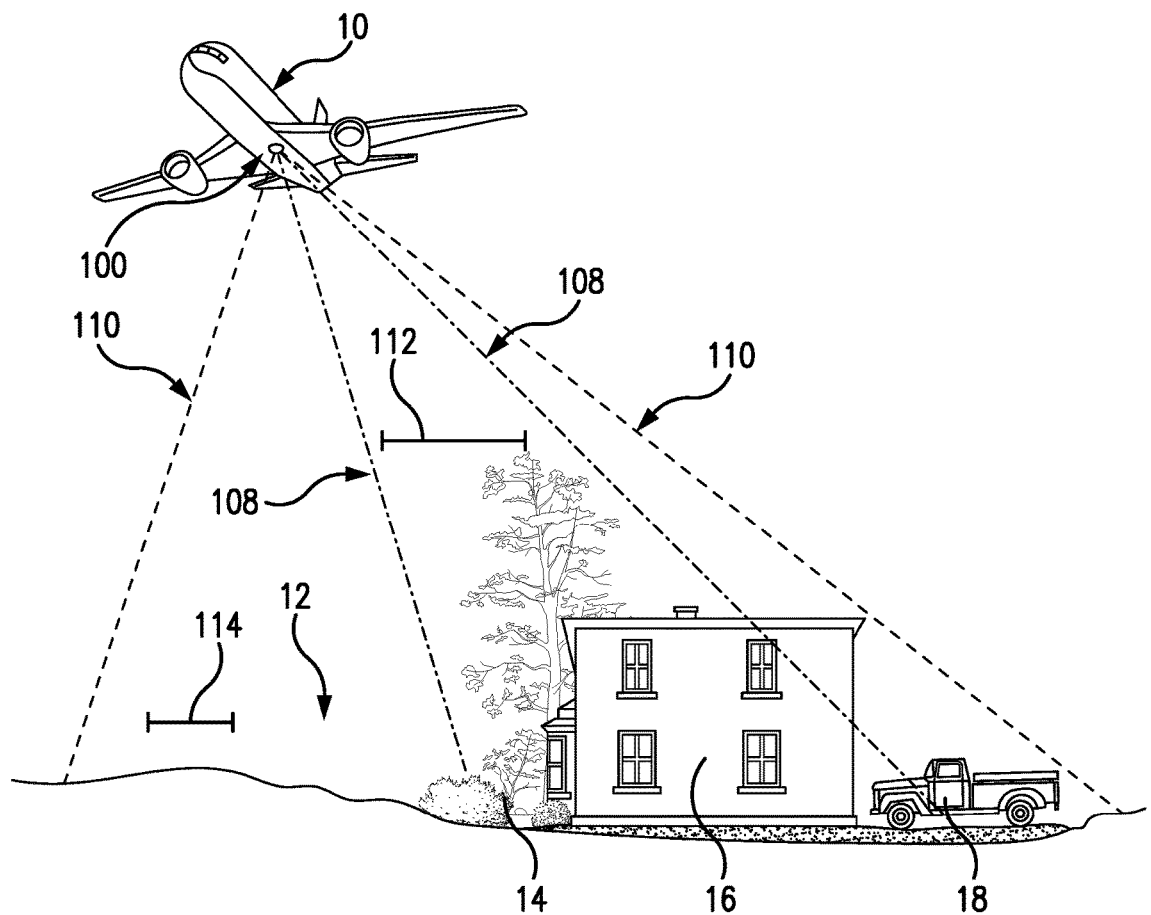
FIG. 1 is a schematic view of an exemplary embodiment of an imaging method in accordance with the present disclosure, showing an imaging system carried by an aircraft acquiring an image and a subsequent image of a scene based on analysis of the first image of the scene.

Reference will now be made to the drawings wherein like reference numerals identify similar structural features or aspects of the subject disclosure. For purposes of explanation and illustration, and not limitation, a partial view of an exemplary embodiment of an imaging system and associated method, in accordance with the disclosure is shown in FIG. 1 and is designated generally by reference character 100. Other embodiments of image acquisition methods in accordance with the present disclosure, or aspects thereof, are provided in FIGS. 2-6, as will be described. The systems and methods described herein can be used to improve imaging, such as long range oblique imaging for aircraft and spacecraft imaging the terrestrial scenes.

Imaging system 100 is mounted to an aircraft 10, which may be an unmanned aerial vehicle (UAV). A method of obtaining image data using imaging system 100 includes obtaining a first image 102 and a subsequent second image 104 of a scene 106 with one or more features, e.g., tree 14, structure 16, and vehicle 18. First image 102 and subsequent second image 104 are obtained using an imaging device 106, shown in FIG. 2, which is configured and adapted for obtaining images of a scene with different field of views and different effective resolutions. Using imaging device 106, imaging system 100 acquires second image 104 subsequent to first image 102 with a second field of view 108 that is smaller than a first field of view 110 of first image 102 and, consequently, a second effective resolution 112 that is greater than an effective resolution 114 of first image 102. The difference in scope between first field of view 110 and second field of view 108 is indicated by the relative separation between the dashed lines and dashed-dotted lines intersecting scene 12.

Figure 2:
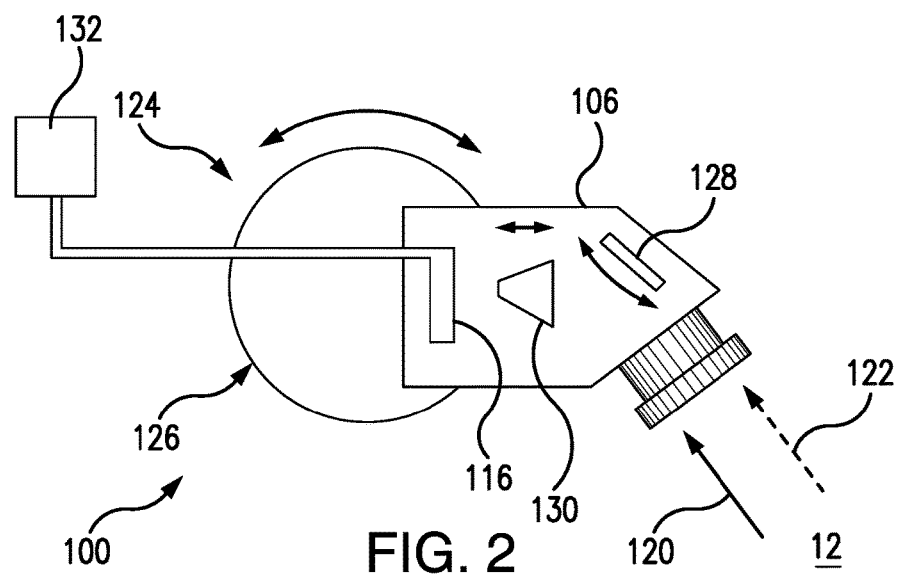
FIG. 2 is a schematic view of the imaging system of FIG. 1, showing elements of the system for tilting, panning, and zooming an imaging device of the imaging system.

With reference now to FIG. 2, imaging system 100 is shown. Imaging system 100 includes imaging device 106 which has an imaging sensor 116 optically coupled to optics 118 for forming an image on the imaging sensor 116. Imaging sensor 116 can be a focal plane array, e.g. a two-dimensional array, or any other suitable type of imaging sensor. In certain embodiments, imaging sensor 116 can be arranged to generate image data using visible wavelength band electromagnetic radiation 120, e.g., blue-red-green light, incident on imaging sensor 116. In accordance with certain embodiments, imaging sensor 116 can be arranged to generate image data representative of non-visible wavelength band electromagnetic radiation 122, e.g., short-wavelength infrared band electromagnetic radiation, near-infrared band electromagnetic radiation, mid-range band infrared electromagnetic radiation, and/or thermal band electromagnetic radiation, incident on imaging sensor 116.

Imaging sensor 116 is mounted to a platform 124 arranged for one or more of panning, tilting, or zooming the imaging sensor 116 over an imaging area while successive images of the imaging area. Platform 124 may include a gimbal 126 configured to rotate the imaging sensor 116 while obtaining successive images, schematically indicated by the curved double-ended arrow above gimbal 126 in FIG. 2. Platform 124 may include a panning element 128 configured to pan electromagnetic radiation acquired from scene 12 over imaging sensor 116, as schematically indicated with the double-ended array below panning element 128 in FIG. 2. Platform 124 may include a zoom element 130 arranged for changing the effective field of view and effective resolution of imagery acquired by imaging sensor 116, schematically indicated by the double-ended arrow above zoom element 130 in FIG. 2. Obtaining the images can include obtaining the successive images including an object of interest, e.g., object 14, 16, 18 (shown in FIG. 1), according to recognition of the object in a controller 132 operatively connected to imaging device 106.

Figure 3:
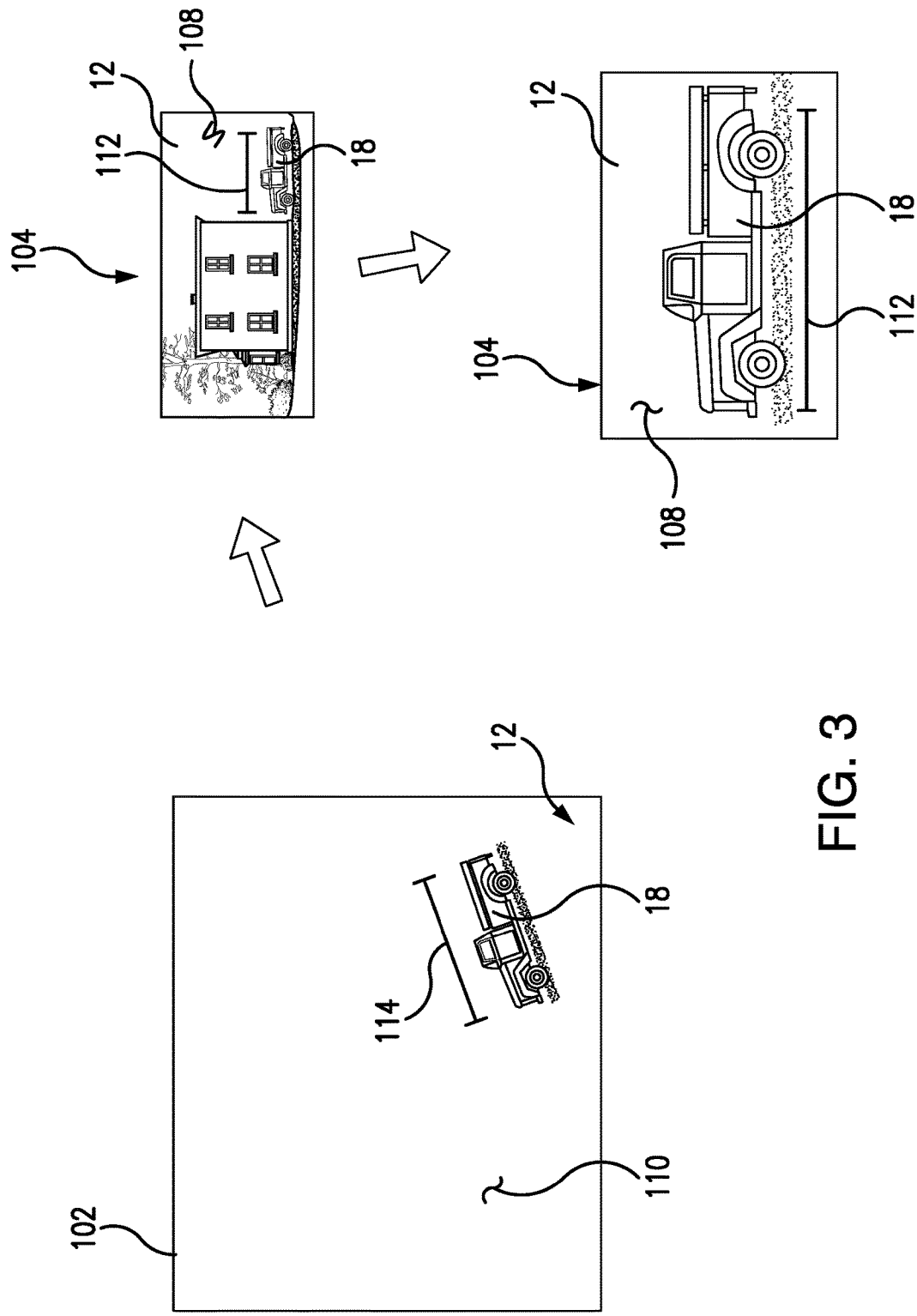
FIG. 3 is a schematic view of the image and subsequent image of FIG. 1, showing a feature present in the scene appearing with in the subsequent image with a smaller field of view and greater effective resolution than in the prior image.

With reference now to FIG. 3, images obtained with imaging system 100 are shown. First image 102 is obtained with first field of view 110 and first effective resolution 114. For purposes of the present disclosure, effective resolution means the smallest feature in an imaged scene that can be discerned using image data acquired of the scene. In one embodiment, the effective resolution of an image may be measured in terms of numbers of pixels per unit length of the area being imaged. First image 102 is analyzed using a visual attention algorithm resident on controller 132 to identify one or more areas of interest, e.g., vehicle 18, first field of view 110. Second image 104 is subsequently obtained for the area of interest with second field of view 108 with a second effective resolution 112, second field of view 108 being smaller than first field of view 110 and second effective resolution 112 being greater than first effective resolution 114.

Figure 4:
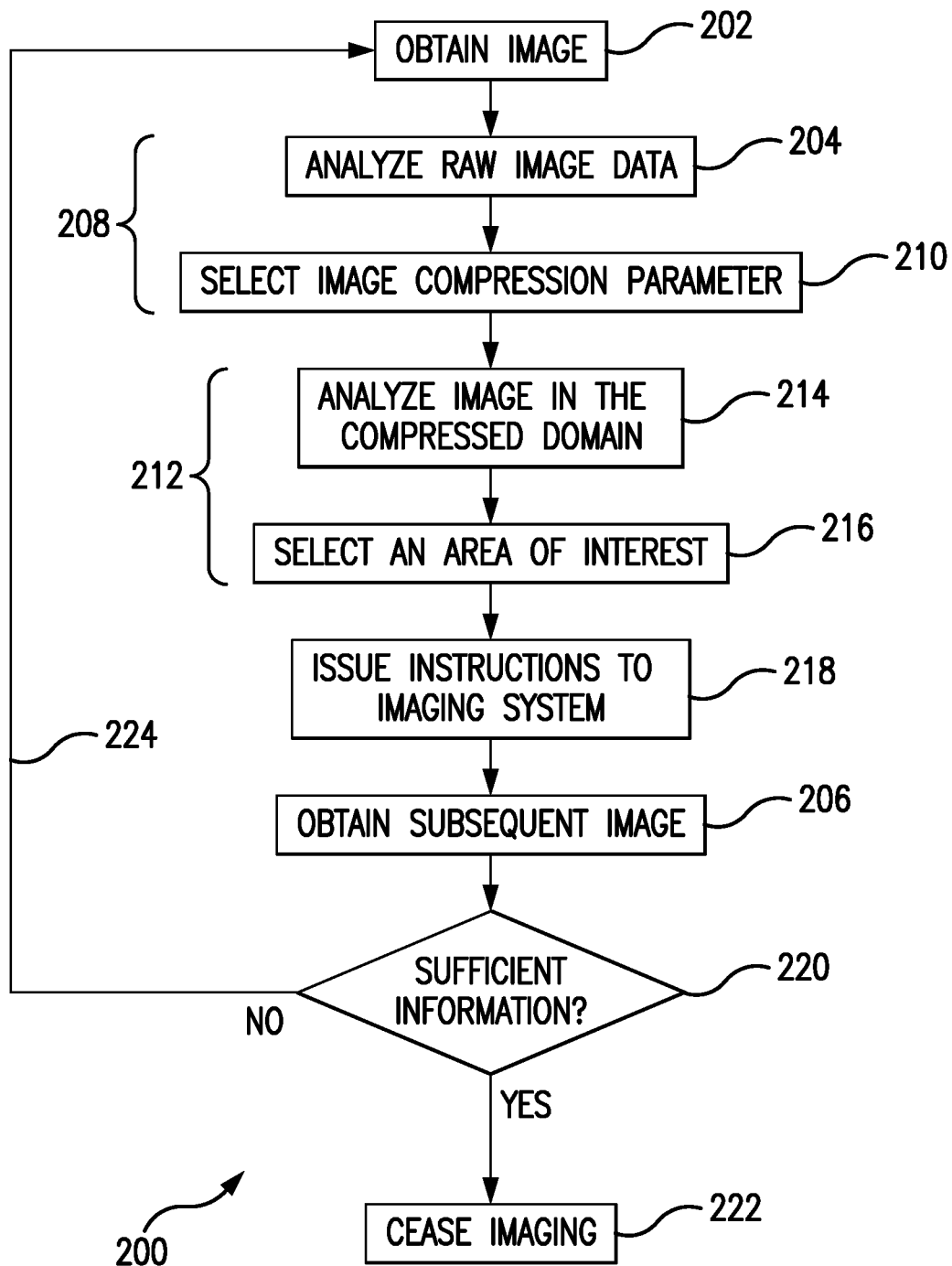
FIG. 4 is a block diagram of a method of imaging a scene associated with the imaging device of FIG. 1, showing analysis of the raw image data for selection of a compression parameter and analysis of the mage in the compressed domain.

With reference to FIG. 4, an imaging method 200 is shown. Imaging method 200 generally includes obtaining an image with a first field of view and first effective resolution, as shown with box 202. The image data is analyzed using a visual attention algorithm, which may be resident in instructions recorded on a non-transitory machine-readable memory of controller 132 (shown in FIG. 2), to identify one or more areas of interest in the first field of view, as shown with box 204. A subsequent image is then obtained for each area of interest with a second field of view and a second effective resolution, the second field of view being smaller than the first field of view and the second effective resolution being greater than the first effective resolution, as shown with box 206.

In an alternative embodiment not illustrated in the drawings, and possibly in the absence of an imaging system with panning, tilting and zooming capabilities, it will be apparent for those familiar in the art that the image acquisition parameters can be adjusted by modifying the positional parameters of the aircraft to which the imaging system is mounted. Specifically, a zoom operation can be effected by positioning the aircraft in closer proximity to the scene; pan and tilt operations can be effected by translating and rotating the aircraft about its axis. In yet another embodiment, adjustment of the image acquisition parameters can be achieved by means of combining and imaging system with pan, tilt and zoom capabilities such as that illustrated in FIG. 2 with adjustment of the positional parameters of the aircraft. In one embodiment, the system comprises more than one aircraft equipped with an imaging system device; upon acquisition and analysis of an initial image by one aircraft, the identified one or more areas of interest in the first field of view can then be imaged by a one or more possibly different aircrafts.

Figure 5:
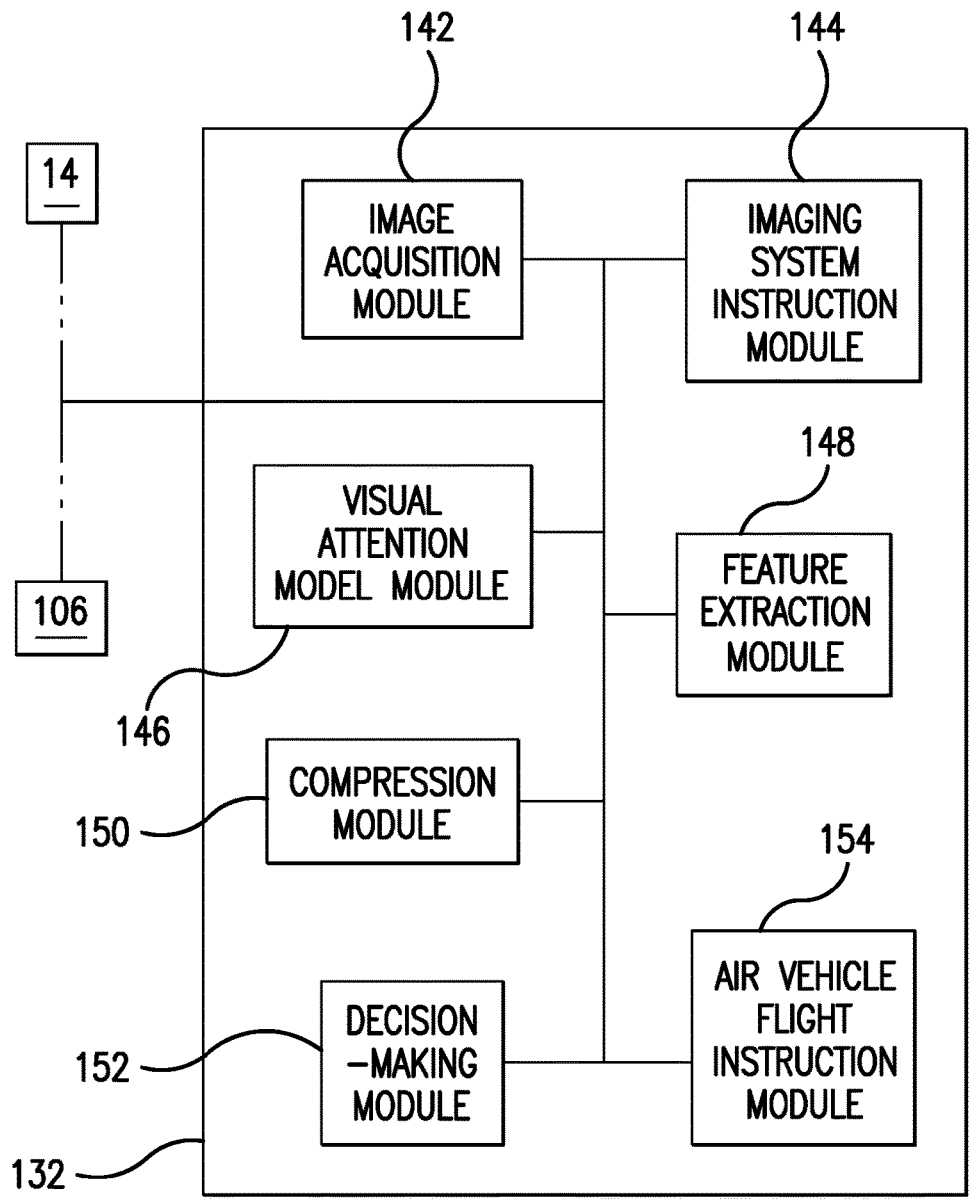
FIG. 5 is a schematic block diagram of an exemplary embodiment of the imaging system of FIG. 1, showing modules for imaging a scene using the imaging system.

With reference to FIG. 5, modules of imaging system 100 are shown according to an exemplary embodiment. Imaging system 100 includes an image acquisition module 142, an imaging system instruction module 144, and a visual attention model module 146. Imaging system 100 also includes a compression module 148, a feature extraction module 150, and a decision-making module 152. It is contemplated that each of the modules may be disposed in communication with one and imaging system 106 and/or aircraft 10.

Image acquisition module 142 is operatively connected with imaging device 106 to obtain image data from a visible wavelength band sensor array, e.g., imaging sensor 116 (shown in FIG. 2), for obtaining images based on visible light incident on the imaging device. In some instances, image acquisition module 142 is operatively connected with imaging device 106 to obtain image data from an infrared wavelength band sensor array, e.g., sensor array 116 (shown in FIG. 2), such as from incident electromagnetic radiation in one or more of a SWIR wavelength band, a NIR wavelength band, a MIR wavelength band, or a thermal wavelength band.

Imaging system instruction module 144 is communicative with imaging device 106 and is arranged to generate and issue instructions to imaging device 106. The instructions issued by imaging system instruction module 144 may cause imaging device 106 to one or more of pan, tilt and/or zoom with respect to a scene of interest. It is contemplated that the instructions be issued in cooperation with image acquisition module 142 obtaining image data from imaging device 106, subsequent images acquired after issuance of instructions thereby causing change in one or more of pan, tilt, and/or zoom in images image subsequently obtained by imaging device 106 relative to a prior image.

Visual attention model module 146 is communicative with image acquisition module 142 and imaging system instruction module 144, and is arranged to provide input to imaging system instruction module 144 according to analysis of image data received from image acquisition module 142. Based on the input from the visual attention model module 146, imaging system instruction module 144 may generate the one or more of pan, tilt, and/or zoom instructions for display module 106. The input provided by the visual attention model module 146 may be based on the analysis of an image previously acquired by image acquisition module 142. The instructions generated by the Visual Attention model Module are such that each subsequent series of images being acquired has a field of view that is greater than the field of view of the previously acquired images and has an effective resolution that is greater than that of the previously acquired images.

In contemplated embodiments, visual attention model module 146 may cooperate with an air vehicle flight instruction module 154 to issue flight instructions to aircraft 10, aircraft 10 mounting imaging device 106, the flight instructions thereby changing a flight parameter of aircraft 10 (pitch, yaw, altitude, etc.) modifying subsequent image data obtained by image acquisition module 142 in relation to prior image data obtained by image acquisition module 142.

Compression module 148 and feature extraction module 150 are both communicative with image acquisition module 142 and visual attention model module 146. In certain embodiments, visual attention model module 146 receives raw image data from visual attention model module 146 and analyzes the raw image data. In accordance with certain embodiments, feature extraction module 150 first extracts features from image data obtained by image acquisition module 142, communicates the extracted features to visual attention model module 146, which performs analysis on the extracted features. In accordance with certain embodiments, compression module 148 analyzes on compressed image data.

Compression module 148 may generate a compressed data representation directly from the raw imagery acquired by the image acquisition module 142. In certain embodiments, compression module 148 may generate a compressed data representation of the feature representation extracted by feature extraction module 150 from the raw image data. In some embodiments, the compression parameters may be selected and applied by compression module 148 according to a type of decision to be made from image data obtained by image acquisition module 142 according the type of decision that has to be made about the scene.

Decision-making module 152 is communicate with the feature extraction module 150 and is arranged to make decisions about the scene based on aggregated information extracted from the image data. The decision about the scene may be based on identification of a type of object in the scene and/or identification of a type of activity taking place in the scene. It is contemplated that decision-making module 152 can issue instructions to cease imaging upon making a determination that sufficient information has been obtained from the processing of the acquired imagery.

The proposed system and method would showcase improved accuracy relative to traditional image analysis frameworks due to its ability to zero-in on areas of the data that are of higher relevance to the decision-making task. Cost-effective resource allocation is a direct consequence of the approach, since only a subset of locations within the area being surveyed is imaged with a narrow scope. Gains in computational complexity are also incurred due to the fact that only a small fraction of the incoming data is effectively processed.

In one embodiment, the image analysis process is performed by a computer vision system comprising a visual feature extraction module and a sequential analysis module. The visual feature extraction module would extract, for each acquired image, features representative of the appearance of the image. Such features may comprise features selected a priori including color, texture, edge, human visual saliency, depth, and shape descriptors. Alternatively, features may be learned in an end-to-end fashion via the use of deep neural networks (NN) including fully connected feedforward networks, multi-layer perceptrons and convolutional neural networks (CNN). These networks process the incoming visual data through a series of layers that effectively perform non-linear mappings of the input data. The output of each intermediate layer can be interpreted as a visual feature. The advantage of these types of visual features is that they are optimized to the decision-making task for which the network is being used. This is because the parameters of the non-linear mapping functions are optimized in an offline or training stage where data with known corresponding ground truth is passed through the network to obtain a decision. The decision issued by the network is compared with the decision corresponding to the ground truth, and the difference between both (or the decision error) is used to adjust the parameters of the intermediate non-linear mappings. This process is repeated for a large number of training samples until convergence on the parameters of the non-linear mappings is achieved. In one embodiment, the parameter adjustment is performed within a gradient descent framework, wherein the contribution of each of the parameters to the decision error is computed, and the parameter is adjusted at each step so that its contribution to the error decreases; in this embodiment, the adjustment process can be stopped after a fixed number of iterations or, alternatively, after adjustment of the parameters results in improvement of the decision error by a magnitude smaller than a predetermined threshold. When the system is deployed, the parameters of the non-linear mappings are fixed and the intermediate outputs of each of the layers can be used as visual features.

Once extracted, the visual features of each of the acquired images are fed to a sequential analysis module in charge of aggregating the features extracted at each step and deciding the image acquisition parameters for the next step. This module can take the form of a Recurrent NN or, in some cases, a Long-Short-Term Memory Network (LSTM); other frameworks for time-series analysis including Markov Models and Hidden Markov Models can be used. The temporal aggregation module would also determine whether all the information necessary to make a decision is available, in which case it would stop the acquisition process and output a decision regarding the input imagery. As in the case of the deep visual feature extraction module, the parameters of the sequential analysis module can be learned in an offline or training stage with the help of labeled training data. As the sequential analysis module receives visual features extracted from the image, it analyzes the features and makes a determination about whether more images are required or not. If more images are required, the acquisition parameters of the additional images are determined. If enough images have been acquired, the module issues a decision about the scene being surveyed, the decision being in the form of, for example, the type of objects being present in the scene, the type of action or activity being carried out in the scene, and the like.

As indicated by bracket 208, a compression method includes obtaining an image represented by raw image data and analyzing the raw image data to determine content of the image, as shown with box 204. An image compression parameter is selected based on the content of the image and a received decision-making task, as shown with box 210. The image is thereafter compressed based on the selected compression parameter and output as a compressed image. The received decision-making task can be, for example, compress with high fidelity features that are conducive to accurate recognition of certain objects in a scene, e.g., people, vehicles, and/or structures. These may include, for example, features descriptive of shapes, color, or texture. In other embodiments, features that are conducive to accurate recognition of certain activities may be compressed with high fidelity. These may include, for example, features descriptive of motion patterns. Another example of lossy compression includes the application of one or more non-linear mappings that map the raw image from its original high-dimensional space to a lower dimensional space, the parameters of the mapping being adjustable to at least one of the image data and a task-oriented metric corresponding to a received decision-making task such as an object classification or action/activity recognition task.

As indicated with bracket 212, a method of imaging a scene can also include analyzing an image in the compressed domain, as shown with box 214, and selecting an area of interest based on the analysis in the compressed domain, as shown with box 216. Analysis in the compressed domain can include analyzing the compressed image with a visual attention algorithm to identify one or more areas of interest in the image. Subsequent images can be acquired in operation 206 can be obtained for each area of interest, each image having a field of view smaller than the prior image and having greater effective resolution than the prior image.

Once an object of interest is identified in operation 216 instructions can be generated by the imaging system controller, e.g., controller 132, for panning, zooming, and tilting an imaging device, e.g., imaging device 106, carried by an aerial vehicle, e.g., aircraft 10 (shown in FIG. 1). It is contemplated that selection of the compression parameter in operation 210 and analysis of the image in the compressed domain in operation 214 be done in real-time with the obtaining of raw image data in operation 202. This allows for the image data collection to be customized according to the content of the imagery as it is received at the aircraft, without the need for off-platform analysis and the implied links and bandwidth to push the information to an off-platform exploitation resource. Instead, the instructions are autonomously issued to the imaging system to acquire one or more subsequent images, as shown with box 218, and determination made as to whether the content of the image has sufficient information, as shown with decision box 220. Based upon a determination of whether sufficient information is present in the image, imaging can cease, as shown with box 222, or imaging can continue, as shown with arrow 224.

In one embodiment, the task-oriented compression is implemented by means of unsupervised deep learning architectures, which could include Convolutional Auto Encoders (CAEs) and Recurrent Auto Encoders (RAEs) to compress high spatial resolution images, and high spatio-temporal resolution video respectively. The task-oriented nature of the proposed compression framework is related to the fact that, although the transmitted and stored data can be represented with much fewer bits than the original data, the decisions made based on the compressed data closely approximate those made with the uncompressed data. This is, as stated, achieved by tuning the compression process relative to the decision-making task at hand.

The implementation of such deep networks usually takes place in a two-step procedure. In the offline or training stage, the parameters of the networks are optimized based on a given objective, which is related to the decision-making task at hand. In the case of CAEs and RAEs, the optimization takes place in an unsupervised manner, where the objective function aims at maximizing reconstruction accuracy of a given input at the output, the output being obtained by decompressing a compressed representation of the input. In the proposed method, in addition to a reconstruction error term, a task-related error term (e.g., an object or action classification or recognition error term) is also considered in the optimization of the Auto Encoder (AE). This means that the parameters of the nonlinear mappings occurring at the intermediate layers of the AE network are adjusted based on the joint optimization of a reconstruction metric (e.g., how accurately the original data can be recovered from its compressed representation) and a decision-making task such as classification or recognition (e.g., how accurately a given object or action can be identified in the compressed representation of an image or video). In one embodiment, the parameter adjustment is performed within a gradient descent framework, wherein the contribution of each of the parameters to the estimated combined error is computed, and the parameter is adjusted at each step so that its contribution to the error decreases; in this embodiment, the adjustment process can be stopped after a fixed number of iterations or, alternatively, after adjustment of the parameters results in improvement of the combined error by a magnitude smaller than a predetermined threshold. This results in intermediate representations that more efficiently maintain the information that is relevant to the task. In other words, while the recovered data may not necessarily faithfully represent the original data, the information contained therein is sufficient to carry out the decision-making task robustly and accurately. The compression architecture optimized in this manner can then be used as the input module to a computer vision (e.g., deep learning or otherwise) pipeline that effectively operates in the compressed domain, such as the one being proposed in the present disclosure.

As will be appreciated by those of skill in the art in view of the present disclosure, application of automated reasoning to visual data, and particularly deep learning (DL) automated reasoning frameworks, can require considerable computing resources. By way of illustration, imagery and/or video acquired from aerial platforms such as unmanned aerial vehicles (UAV) equipped with an imaging device generally have a relatively wide field of view. Due to its wide-angle nature, imagery from such platforms typically contains a variety of object types including background objects (e.g., vegetation, bodies of water, buildings, roads, etc.) as well as foreground objects, some of which may be of interest (e.g., people, vehicles, weapons, etc.). It is necessary to analyze this imagery to determine imagery of interest from the acquired imagery rapidly, in real-time or in near-real-time, such the acquired imagery can be fully exploited.

One approach to analyzing such imagery is through a sliding window approach, where an image analyzed by segmenting the image into smaller blocks of different sizes, which are thereafter assigned categories independently. Consequently, the computational complexity of said algorithms scales with the number of pixels in the incoming imagery. The motivation behind this modus operandi stems from the requirement of most computer vision algorithms to operate in highly supervised environments in which a given image is representative of a single class only, that is, where an object or objects present in a given image belong to a single category; clearly, this requirement is more easily satisfied by images covering small fields of view since this limits the possible range of labels of objects present in the image.

In order to overcome these limitations, visual attention models which learn to process information only at locations of the incoming imagery that are relevant to the decision-making task at hand, have recently been successfully integrated with computer vision algorithms. The benefits of these approaches are improved computational efficiency as well as added robustness to multiple class labels per image. Their main limitation, however, lies in the fact that they are passive in that they operate on fixed imagery and have no influence on the image acquisition process. We propose to bring visual attention models and computer vision algorithms into the image acquisition loop in order to guide the image capture process in real time in a framework which we denote active visual attention models.

According to the proposed framework, a sequence of images of an area being surveyed for classification (e.g., determining whether there is a threat or not) would be acquired in a process that is guided by the visual attention model. The process regulates the acquisition of imagery in a sequential manner, with images in each step in the sequence having a narrower scope (i.e., smaller field of view) but higher effective resolution (i.e., larger number of pixels per unit length) than images in previous steps, the narrower scope corresponding to increased discriminability attributes (e.g., more informative image regions) of the imagery relative to the decision-making task at hand. The location and nature of each image in the process is determined by aggregated analysis of all of the previously acquired images. This approach results in highly efficient resource utilization since there is no need to image up-close every location within the area being surveyed. The process would stop when the model determines enough information has been sequentially aggregated from the area being surveyed. Since the acquisition, transmission and processing of the relevant imagery may be effected in systems with bandwidth limitations, actionable compression architectures can be employed relying on unsupervised Convolutional Auto Encoders (CAEs) and Recurrent Auto Encoders (RAEs) to compress high spatial resolution images and high spatio-temporal resolution video respectively. The actionable nature of the proposed compression framework is related to the fact that, although the transmitted and stored data can be represented with much fewer bits than the original data, the decisions made based on the compressed data closely approximate those made with the uncompressed data.

The proposed active visual attention model would showcase improved accuracy relative to traditional computer vision frameworks due to its ability to zero-in on areas of the data that are of higher relevance to the decision-making task. Cost-effective resource allocation is a direct consequence of the approach, since only a subset of locations within the area being surveyed are imaged with a narrow scope. Gains in computational complexity are also incurred due to the fact that only a small fraction of the incoming data is effectively processed. Lastly, the system will be able to operate in bandwidth-limited channels with little effect on its decision-making accuracy due to its compression capabilities.

To illustrate the benefits of the proposed technology, consider the case of a UAV equipped with an imaging device having pan, tilt and zoom (PTZ) capabilities. In this scenario, and in order to perform analysis of imagery of an area being surveyed, an initial image is acquired at the widest focal setting possible (corresponding to the widest field of view). Visual attention analysis on the acquired image would yield a candidate location (or set of candidate locations) for further, more detailed analysis. Additional, narrower scope (e.g., more tightly framed) imagery would then be acquired of each of the identified candidate locations by adjusting the PTZ parameters, and the visual attention analysis would be performed again on each of the images. The process would continue until the model decides that there are no more regions to process, and a decision would be made regarding the nature of the imagery acquired by sequentially aggregating the information extracted at each step. Note that there are slight implementational variations that can be enabled under the proposed framework. In one alternative scenario, a UAV may be equipped with an imaging acquisition device with non-adjustable imaging parameters. In this case, the subsequent images may be acquired by adjusting the positional parameters of the UAV, which would effectively modify the image acquisition parameters. In another scenario, in addition to a primary UAV, which again may be equipped with an imaging acquisition device with non-adjustable imaging parameters, one or more secondary UAVs (also with imaging capabilities) would be available to acquire the additional imagery, the parameters of the additional imagery being determined by the location of the secondary UAVs, by the parameters of the image acquisition device in the secondary UAVs, or by a combination of both.

The proposed model would be enabled by an NN or, preferably, a CNN which would extract features representative of the incoming visual data. The extracted features would be fed to an RNN or, in some cases, to a Long-Short-Term Memory Network (LSTM) which would be in charge of aggregating the features extracted at each step and deciding the acquisition parameters for the next step. The LSTM would also determine whether all the information necessary to make a decision is available, in which case it would stop the acquisition process and output a decision regarding the input imagery. Additionally, and optionally, in cases where data compression is required, a CAE or RAE would compress the incoming data and feed the compressed data stream to the NN or CNN. The visual attention model in this case would operate in the compressed feature space determined by the CAE/RAE.

The implementation of deep networks usually takes place in a two-step procedure. In the offline or training stage, the parameters of the networks are optimized based on a given objective. In the case of CAEs and RAEs, the optimization takes place in an unsupervised manner, where the objective function aims at maximizing reconstruction accuracy of a given input at the output, the output being obtained by decompressing a compressed representation of the input. For NNs, CNNs, RNNs and LSTMs, the optimization is supervised in that labels corresponding to the ground truth are required for the training data. The optimization is done in the form of backpropagation (across layers for NNs and CNNs, or across layers and time for RNNs and LSTMs) where the output corresponding to a given input is compared to the ground truth and the difference between both is used to adjust the network coefficients. In the online or inference stage, an input with an unknown label is fed into the network and forward propagated, producing a compressed representation (in the case of a CAE and a RAE), a feature representation (in the case of an NN and a CNN), or a set of sampling parameters and a class label (in the case of an RNN or an LSTM). Advantageously, the off-line stage can be down using readily available off-the-shelf processing engines and software. Examples of suitable processing engines for the off-line stage include the K80 graphical processing units (GPU) accelerator, available from the Nvidia Corporation of Santa Clara, Calif. The on-line and off-line stages can be implemented on the processing engine using deep learning software available such as Caffe, available from the Berkeley Vision and Learning Center of Berkeley, Calif.; Theano, available from the Université de Montréal of Montreal, Canada; and Digits, available from the Nvidia Corporation of Santa Clara, Calif.

In certain embodiments described herein, an image acquisition method is provided that is guided in real-time. Real-time guidance of the image acquisition process improves the computer vision and visual attention models applied by the image acquisition method. In accordance with certain embodiments, only selected regions within a scene to be imaged are considered in the decision making process. Limiting the selected regions to be considered improves resource allocation. Moreover, as only relevant portions of the incoming data are processed, embodiments of the image acquisition methods provided herein are computationally efficient. It is also contemplated that, in embodiments wherein the image acquisition methods operates in the compressed domain, operation in the compressed domain reduces storage and bandwidth requirements of the image acquisition method.

Figure 6:
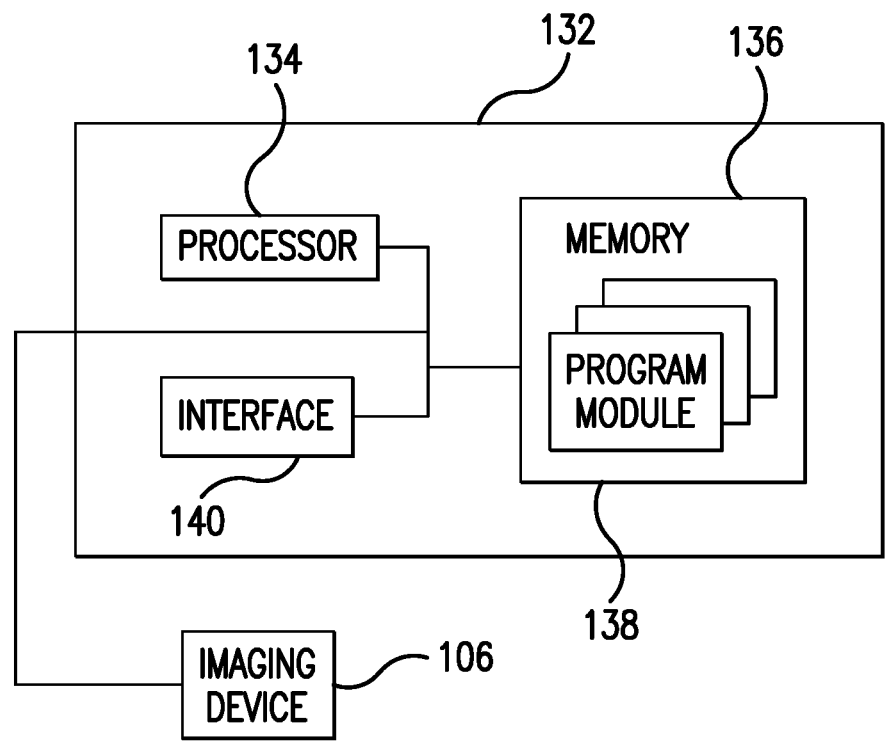
FIG. 6 is a schematic diagram view of an exemplary embodiment of the imaging system of FIG. 1, showing elements containing instruction for imaging a scene using the imaging system.

With reference to FIG. 6, an exemplary embodiment of an imaging system 100 is shown. Imaging system 100 includes a controller 132. Controller 132 has a processor 134 and a memory 136. Memory 136 is disposed in communication with processor 134 and includes (or may be) a non-transitory, machine-readable medium having instructions recorded thereon that, when read by processor 134, cause controller 132 to executed certain operations, e.g., the above-described operations and associated methods. In the illustrated exemplary embodiment memory 136 includes one or more program modules having the instructions recorded therein, and an interface 140 connects controller 132 with imaging device 106.

As will be appreciated by those skilled in the art, aspects of the present embodiments may be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in a flowchart and/or block diagram block or blocks.

Traditional imaging methods employ passive imaging techniques. As described herein visual attention models and computer vision algorithms are brought into the image acquisition loop in order to guide the image capture process in real time or near-real-time in a framework denoted as active visual attention models. According to the proposed framework, a sequence of images of an area being surveyed for classification (e.g., determining whether there is a threat or not) would be acquired in a process that is guided by the visual attention model. The process regulates the acquisition of imagery in a sequential manner, with images in each step in the sequence having a narrower scope (i.e. a smaller field of view) but higher effective resolution (i.e. a larger number of pixels per unit length) than images in the previous steps, the narrower scope corresponding to increased discriminability attributes (e.g., more informative image regions) of the imagery relative to the task at hand. The location and nature of each image in the process is determined by aggregated analysis of all the previously acquired images. This approach results in highly efficient resource utilization since there in no need to image up-close every location within an area being surveyed. The process would also cease when the model determines enough information has been sequentially aggregated from the area being surveyed.

For example, in the case of a UAV equipped with an imaging device having pan, tilt, and zoom capabilities, in order to perform analysis of imagery of an area being surveyed, an initial image is acquired at the widest focal setting possible corresponding to the widest field of view. Visual attention analysis is then performed on the acquired image to yield one or more candidate locations for further detailed analysis (or survey). Additional, narrower scope (e.g., more tightly framed) imagery would then be acquired of each of the identified candidate locations by adjusting one or more of the pan, zoom, and tilt of imaging system, and the visual attention analysis performed again on each of the narrower scope imagery. The acquisition/analysis/adjustment/acquisition would continue until the model decides that there are no more regions to process, and a decision would be made regarding the nature of the imagery acquired by sequentially aggregating the information acquired at each step.

In the case of a UAV having a more limited imaging device, e.g., without one or more of pan, tilt, and zoom capability, subsequent imagery can be adjusted by adjusting a parameter of the UAV. This could, for example, be accomplished by changing a flight parameter of the UAV—the UAV itself being used by the model to modify image acquisition parameters of subsequently acquired images.

In certain embodiments, in addition to a primary UAV, which again may be equipped with an imaging device with non-adjustable imaging parameters, one or more secondary UAVs with imaging capabilities would be available (e.g., operatively connected to the model and/or therethrough the primary UAV) to acquire additional imagery. The parameters of the additional imagery are determined by the location of the secondary UAVs, by parameters of the image acquisition device in the secondary UAVs, or by a combination of both.

It is contemplated that the model can include a feature extraction module to extract features representative of incoming visual data. The module could have, by way of non-limiting example, a neural network or a convolutional network; other features (e.g., hand-engineered features) could be extracted including those related to color, texture, shape, depth, points of interest, saliency, etc.). The extracted features could be fed to a module in charge of aggregating the features extracted at each step, and deciding the acquisition parameters for the next step. This module could, for example, include a recurrent neural network or a long-short-term memory network, or other frameworks for time-series analysis such as Markov Models or Hidden Markov Models. It is also contemplated that the module would determine whether all the information necessary to make a decision is available, in which case the module would stop the acquisition process and output a decision regarding the input imagery.

The methods and systems of the present disclosure, as described above and shown in the drawings, provide for image acquisition methods with superior properties including real-time guidance to the image acquisition method. In certain embodiments, imaging systems and methods are provided with capacity to zero-in on areas of data that have higher relevance to the decision-making task in relative to traditional computer vision frameworks. In accordance with certain embodiments, improved (e.g., cost-effective) resource allocation is provided since only a subset of locations within an area being surveyed are imaged with a narrow scope. It is also contemplated that computational complexity can be reduced owing to only a fraction of incoming image data being effectively processed. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An image analysis system, comprising:
   an imaging device;
   a controller operatively connected to the imaging device; and
   a non-transitory machine-readable memory disposed in communication with the controller and having instructions recorded thereon that, when read by the controller, cause the controller to:
   obtain an image with a first field of view and first effective resolution;
   compress the image with a compression algorithm in accordance with one or more compression parameters;
   analyze the image with a visual attention module to identify one or more areas of interest in the first field of view;
   obtain one or more subsequent images for each area of interest with a second or more fields of view with each of the associated effective resolutions being greater than the first effective resolution;
   make a decision about the scene by aggregating information extracted from the images; and
   adjusting the one or more compression parameters according to the decision made about the scene.

2. The system as recited in claim 1, wherein the instructions cause the controller to make the decision about the scene based on (a) identification of a type of object in the scene, and (b) identification of a type of activity taking place in the scene.

3. The system as recited in claim 1, wherein analyzing the image comprises analyzing raw image data.

4. The system as recited in claim 1, wherein instructions further cause the controller to one or more of pan, zoom, or tilt the imaging device.

5. The system as recited in claim 1, wherein the instructions further cause the controller to adjust a positional parameter of an aerial vehicle carrying the imaging device.

6. The system recited in claim 1, wherein the instructions cause the controller to obtain the second image in real-time or near-real-time with analysis of the prior image.

7. The system as recited in claim 1, wherein the instructions cause the controller to generate one or more of a pan, zoom, and tilt positioning instructions for the imaging device based on the analysis of the acquired image.

8. The system as recited in claim 7, wherein the instructions further cause the controller to issue the positioning instructions to the imaging systems prior to obtaining the subsequent image.

9. The system as recited in claim 1, wherein the imaging device includes a visible wavelength band sensor array for obtaining images based on visible light incident upon the imaging device.

10. The system as recited in claim 1, wherein the imaging device includes a sensor array configured to obtain image data from one or more of a visible wavelength band, a SWIR wavelength band, a NIR wavelength band, a MIR wavelength band, or a thermal wavelength band.

11. The system as recited in claim 1, wherein the instruction cause the controller to cease imaging upon making a determination that sufficient information has been obtained from the processing of the acquired imagery.

12. An image analysis method for making a decision about a scene, comprising:
   obtaining an image of the scene with a first field of view and first effective resolution;
   compressing the image with a compression algorithm in accordance with one or more compression parameters;
   analyzing the image with a visual attention algorithm to identify one or more areas of interest in the first field of view;

obtaining a subsequent image for one or more areas of interest, each of the subsequent images having an associated field of view that is smaller than the first field of view and an effective resolution that is greater than the first effective resolution;

making a decision about the scene by aggregating information extracted from the obtained images; and adjusting the one or more compression parameters according to the decision made about the scene.

13. The method as recited in claim 12, further comprising obtaining a plurality of subsequent images, each of the plurality of subsequent images having different fields of view and/or effective resolution from one another.

14. The method as recited in claim 12, wherein making a decision about the scene comprises one or more of (a) identifying a type of object in the scene, and (b) identifying a type of activity taking place in the scene.

15. The method as recited in claim 12, wherein analyzing the image comprises analyzing raw image data.

16. The method as recited in claim 12, wherein the visual attention algorithm includes a plurality of compression parameters, wherein the method includes selecting a compression parameter according to a decision made about the scene.

17. The method as recited in claim 12, wherein obtaining a subsequent image comprises one or more of panning, zooming, or tilting an imaging apparatus carried by an aerial vehicle.

18. The method as recited in claim 12, wherein obtaining the subsequent image comprises obtaining the subsequent image in real-time or near-real-time.

19. The method as recited in claim 12, further comprising generating one or more of a pan, zoom, and tilt positioning instructions for an imaging system carried by an unmanned aerial vehicle based on the analysis of acquired imagery.

20. The method as recited in claim 19, further comprising adjusting a positional parameter of an aerial vehicle carrying an imaging device.

21. The method as recited in claim 12, wherein obtaining the image includes receiving electromagnetic radiation within one or more of a visible, SWIR, NIR, MIR, and thermal wavelength bands.

22. The method as recited in claim 12, further comprising ceasing imaging when the decision making process determines that sufficient information has been obtained.

* * * * *